(12) United States Patent
Yohn et al.

(10) Patent No.: US 9,021,454 B2
(45) Date of Patent: Apr. 28, 2015

(54) OPERAND AND LIMITS OPTIMIZATION FOR BINARY TRANSLATION SYSTEM

(71) Applicant: Unisys Corporation, Blue Bell, PA (US)

(72) Inventors: Judge William Yohn, River Falls, WI (US); Mitchell A Bauman, Circle Pines, MN (US); Feng-Jung Kao, Roseville, MN (US); James McBreen, Roseville, MN (US); James Merton, Roseville, MN (US)

(73) Assignee: Unisys Corpoation, Blue Bell, PA (US)

( * ) Notice: Subject to any disclaimer, the term of this patent is extended or adjusted under 35 U.S.C. 154(b) by 286 days.

(21) Appl. No.: 13/671,770

(22) Filed: Nov. 8, 2012

(65) Prior Publication Data

US 2014/0130026 A1    May 8, 2014

(51) Int. Cl.
  *G06F 9/44*  (2006.01)
  *G06F 9/45*  (2006.01)
  *G06F 9/455* (2006.01)

(52) U.S. Cl.
  CPC ............... *G06F 8/52* (2013.01); *G06F 9/4552* (2013.01)

(58) Field of Classification Search
  CPC ............ G06F 9/4552; G06F 9/44; G06F 8/52
  USPC ......................................................... 717/151
  See application file for complete search history.

(56) References Cited

U.S. PATENT DOCUMENTS

| | | | | |
|---|---|---|---|---|
| 4,525,780 | A * | 6/1985 | Bratt et al. | 711/163 |
| 6,339,752 | B1 * | 1/2002 | Mann et al. | 703/26 |
| 2005/0086650 | A1 * | 4/2005 | Yates et al. | 717/139 |
| 2007/0253430 | A1 * | 11/2007 | Minami et al. | 370/395.52 |
| 2008/0126764 | A1 * | 5/2008 | Wu et al. | 712/226 |
| 2009/0119089 | A1 * | 5/2009 | Gheith et al. | 703/23 |
| 2013/0024619 | A1 * | 1/2013 | Abdallah | 711/123 |
| 2013/0090913 | A1 * | 4/2013 | Strong et al. | 703/26 |
| 2014/0025893 | A1 * | 1/2014 | Brown | 711/125 |

\* cited by examiner

*Primary Examiner* — Wei Zhen
*Assistant Examiner* — Mohammed Huda
(74) *Attorney, Agent, or Firm* — Richard J. Gregson

(57) ABSTRACT

Methods and systems for optimizing generation of natively executable code from non-native binary code are disclosed. One method includes receiving a source file including binary code configured for execution according to a non-native instruction set architecture. The method also includes translating one or more code blocks included in the executable binary code to source code, and applying an optimizing algorithm to instructions in the one or more code blocks. The optimizing algorithm is selected to reduce a number of memory address translations performed when translating the source code to native executable binary code, thereby resulting in one or more optimized code blocks. The method further includes compiling the source code to generate an output file comprising natively executable binary code including the one or more optimized code blocks.

20 Claims, 10 Drawing Sheets

OPERAND AND LIMITS OPTIMIZATION FOR BINARY TRANSLATION SYSTEM

TECHNICAL FIELD

The present application relates generally to binary code translation for execution of non-native software; in particular, the present application relates to operand and limits optimization for a binary translation system.

BACKGROUND

In modern computer system development with the reduction of individual hardware development, it is becoming common to emulate one machine instruction set on an entirely different system by another using a process called binary translation. This process is implemented for a number of reasons, including:

1. Emulation of machine code of a first system on a different instruction set architecture.
2. Increasing the performance of the source code.
3. Monitoring execution flow to isolate problem areas.
4. Debugging code, especially random execution failures.

Generally, translation of binary code includes translation from a first, non-native code executable using a computing system that implements a non-native instruction set architecture to native code executable on a target computing system implementing a native instruction set architecture.

The reasons for translating one system's instruction set to execute on different hardware and software platforms are numerous. For example, the source system hardware may no longer physically exist but its operating system and user programs need to be retained as a viable product line. As a result, the source operating system and its application suite will be translated to run on different logical and physical platforms. Additionally, it is often the case that the performance of some code could be enhanced by translating it to run on another system platform. Specifically, it is possible that the source instruction set can be more effectively mapped to a new hardware and operating system platform thus yielding an increase in performance and greater economic viability.

In addition to the above, using binary translation to emulate one operating system and its applications on another (target) system has potential to enhance monitoring capabilities that will facilitate performance data collection and analysis, for example by using tools available on that target system. Still another area of system development that might benefit from translation and emulation is the increased ability to debug problems, especially those of an intermittent nature, using increasingly advanced tools available on such target systems.

Given the above advantages of binary translation of software from a source instruction set architecture to a target instruction set architecture, increasing efforts have been focused on determining an efficient process for performing binary translation. For example, some systems implement static translation, in which non-native code is translated to native code prior to execution of that native code on a target computing system implementing a native instruction set architecture. Other systems implement dynamic translation, in which non-native code is translated to native code "on the fly", while executed at the target computing system.

Regardless of the type of translation performed, systems that perform binary translation have many challenges. One challenge involved in translating between computing systems relates to memory addressing and access of data referenced in the instructions defined by the non-native code. That is, non-native binary code to be translated generally includes a series of instructions that each indicate an operation to be performed, such as an addition or multiplication operation, as well data required by the instruction to perform the identified function. This data can, in many circumstances, be an address of data (e.g., an operand) to be used in the operation to be performed. Accordingly, translating binary code can include translating a memory address from the memory addressing scheme provided by the non-native architecture (i.e., the location of the operand) to the memory addressing scheme provided by the target computing system, within the native architecture. This can include, for example, translating an address calculated and typically stored in one or more addressing registers, the equivalent of which may not be available on the target system. It can also include performing one or more verification operations, for example to determine validity of an address to be used to store a particular operand, i.e., whether the resulting address to be used is within the bounds of acceptable addresses to be used by the program being translated. However, when validation of each address defining an operand location is required by the translation, both the translation and subsequent execution of translated code can be time consuming, and can result in reduced performance, whether the translation that is performed is static or dynamic.

For these and other reasons, improvements are desirable.

SUMMARY

In accordance with the following disclosure, the above and other issues are addressed by the following:

In a first aspect, a method for optimizing generation of natively executable code from non-native binary code is disclosed. The method includes receiving a source file including binary code configured for execution according to a non-native instruction set architecture. The method also includes translating one or more code blocks included in the executable binary code to source code, and applying an optimizing algorithm to instructions in the one or more code blocks. The optimizing algorithm is selected to reduce a number of memory address translations performed when translating the source code to native executable binary code, thereby resulting in one or more optimized code blocks. The method further includes compiling the source code to generate an output file comprising natively executable binary code including the one or more optimized code blocks.

In a second aspect, a system for optimizing generation of code natively executable on a computing system based on non-native binary code is disclosed. The system includes a block queue containing a block queue entry associated with each block included within the non-native binary code. The system also includes a matrix queue containing one or more entries each defining a range of validated index and base register pairs. The system further includes an optimization component configured to receive a reference to an unvalidated index and base register pair and replace the reference with a second reference to an entry in the matrix queue representing a validated index and base register pair and an offset.

In a third aspect, a computer-implemented method of optimizing generation of natively executable code from non-native code is disclosed. The method includes receiving a source file including binary code configured for execution according to a non-native instruction set architecture, and determining a number of unique code blocks within the executable binary code. The method further includes translating each of the code blocks included in the executable binary code to source code and storing a record of each of the code blocks as a queue entry in a block queue. The method also includes determining one or more ranges of index and base register pairs used in each of the code blocks and storing the one or more ranges of index and base register pairs in a matrix queue. The method also includes, for each of the instructions in each code block, replacing one or more unvalidated index and base register pairs with a pointer and an offset, wherein the pointer represents a validated index and base register pair included in the matrix queue. The method includes compiling the source code to generate an output file comprising natively executable binary code including the one or more optimized code blocks.

DETAILED DESCRIPTION

Figure 1:
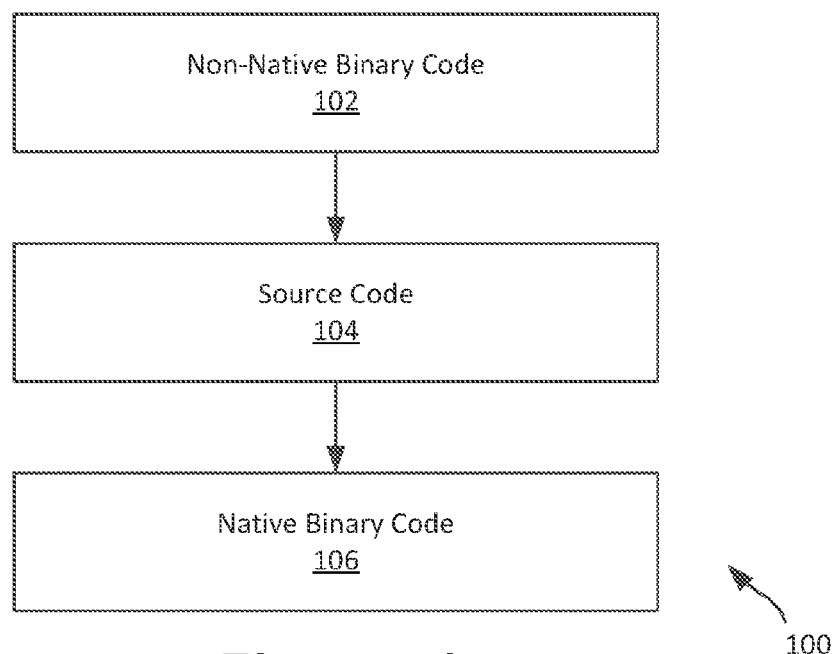
FIG. 1 is a generalized flowchart illustrating a binary translation process in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present application relates generally to binary code translation for execution of non-native software, and in particular, the present application relates to operand and limits optimization for a binary translation system. In particular, the present application relates to applying an optimization to one or more instructions included in source code derived from non-native binary code. The optimization can, in some embodiments, reduce the number of memory validations required of the native code compiled from the source code, for example by building one or more queues or other data structures containing validated operand addresses and acceptable limits to those addresses. Using those data structures, an optimization process can be applied in which unvalidated addresses (i.e., addresses expressed in terms of non-native register or memory address references which would have not previously been assessed as within the limits of acceptable addresses for the program or programs being translated at the time that particular instruction is executed) can be expressed as related to validated addresses (i.e., addresses for which validation has already occurred during translation or execution). Therefore, in many instances, validation procedures for each address in a code block can be avoided during translation or execution. As discussed further below, the various embodiments described herein can result in improved efficiency in translating to a native instruction set architecture and executing translated code, by avoiding such delays for address verification.

Referring now to FIG. 1, an example process flow 100 for binary translation is illustrated, in which optimizations can be applied in accordance with the present disclosure. In the process flow 100, an initial non-native binary file 102 is received for translation and execution on a native instruction set architecture. In various embodiments, the non-native binary file 102 can include one or more programs configured to run on a computing system having a non-native instruction set architecture. In some embodiments discussed herein, the non-native instruction set architecture can be the Unisys ClearPath instruction set architecture, maintained by Unisys Corporation of Blue Bell, Pa. However, in alternative embodiments, other instruction set architectures (e.g., ARM, PowerPC, IA64, etc.) could be used as well.

The non-native binary file 102 includes instructions that perform a variety of operations on data, including data stored at various memory locations. For example, an addition or multiplication operation is defined by an opcode, and includes two operands that are added or multiplied, and stored. One or both of the operands included in the instruction can be defined using a particular memory addressing system provided by the non-native instruction set architecture. That memory addressing system can use, in some embodiments, one or more registers that reference other portions of memory that contain operand data. In one possible embodiment, registers can include a base register and an index register, as are available in the Unisys ClearPath instruction set architecture. Other registers or memory addressing schemes could be used as well.

Generally, in the process flow shown, the non-native binary file 102 is converted, or translated, to a source code file 104. The source code file includes each of the instructions defined in the non-native binary file 102 rewritten in a source code language. This can be done, for example, by parsing the non-native binary file 102 to detect each instruction, including the opcode and operands used, and to convert those instructions to commands in source code. The source code file 104 can be written in any of a variety of languages capable of expressing each of the instructions supported in the non-native instruction set architecture and also capable of compilation into binary code in the native instruction set architecture. In some embodiments, the source code file 104 is written in a variant of the C/C++ programming languages; however, in alternative embodiments, other source code languages could be used.

A native binary file 106 is then typically generated from the source code file 104. The native binary file 106 represents the compiled source code file that is executable on a computing system implementing a native instruction set architecture. In some embodiments, the native instruction set architecture can be an Intel-based instruction set architecture, such as the x86-32 or Intel-64 instruction set architectures. In such embodiments, the native binary file 106 can be configured to be natively executable within an operating system, such as a Linux-based operating system, on the native computing system.

In general, the native binary file 106 is typically generated using a compiler configured for generation of binary code executable on the native computing system. However, the implementation of the source code file 104 dictates the extent to which specific features are incorporated in the native binary file 106, and the extent to which functionality is required in the native binary file. For example, in an example embodiment where the non-native binary file 102 is configured for execution on a Unisys ClearPath system, one or more operands may be addressed by a combination of a base register and an index register. In such embodiments, the source code file 104 may include a predefined function constructed to resolve the register contents to a location in memory of a native system on which the source code file 104 is compiled, and will typically include one or more validity assessments. These validity assessments typically include determining whether the resolved address based on the register contents falls within a range of acceptable addresses, and validating that the address in fact contains the desired data. As explained further in connection with FIG. 2, below, such validity assessments are required at least before a first access of a particular address, to validate that address as a correct operand address.

As further discussed below, in some embodiments of the present disclosure the native binary file 106 is generated from a source code file 104 on which one or more optimizations are applied. These optimizations can, in some circumstances, represent alternations of the source code file 104 to improve execution efficiencies. As further discussed in connection with FIGS. 2-9, below, the optimizations can include transformations of source code instructions, such that fewer address validations need be performed. In particular, use of one or more functions defined in source code that represent unvalidated base register and index register addressing pairs as offsets from validated pairs allows for use of a source code file 104 that lacks such validations for each operand, thereby improving translation and execution efficiency.

Figure 2:
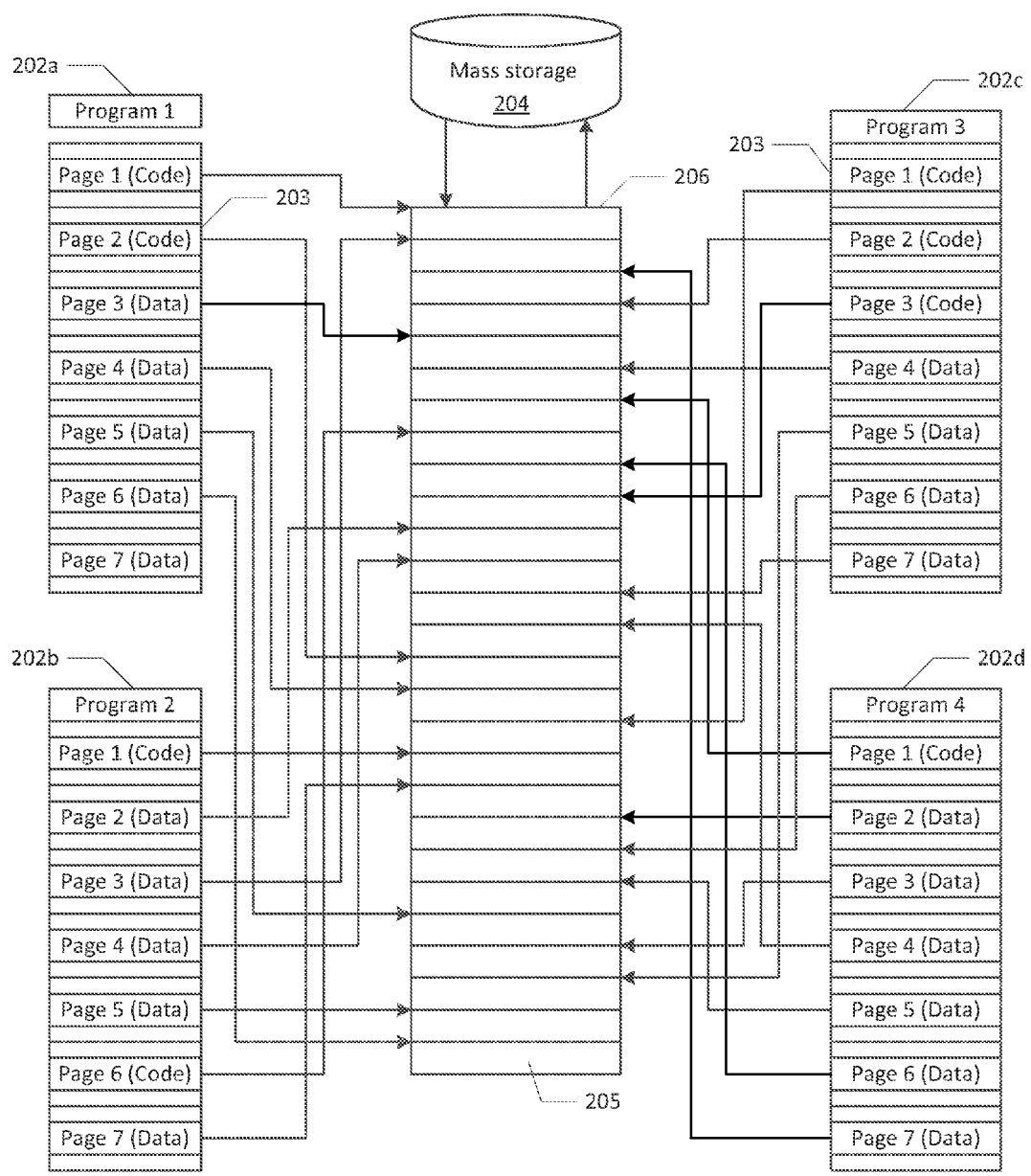
FIG. 2 is a logical storage diagram illustrating correlation of one or more programs to physical memory addresses in a computing system in an example computer architecture.

Referring now to FIG. 2, an example memory allocation diagram 200 is shown, in which a number of programs can be stored in and loaded from memory of a computing system. In general, the memory allocation diagram illustrates a plurality of programs, shown as programs 202a-d, which are originally stored on disk, such as physical disk 204. When each program is loaded into a memory of a computing system for execution, the program is then loaded into memory 206. As illustrated, each program 202a-d generally includes a plurality of pages 203, including code and data pages. Each of the pages 203 for each program 202a-d can be maintained separately in different locations in the memory 206.

Generally, an operating system dictates the manner in which memory is allocated to each program. In the embodiment shown, each of the programs 202a-d are allocated interspersed blocks 205 throughout the memory 206, with the pages 203 of a program associated with a particular block. For example, a program may have pages representing code blocks with each code block stored in a different memory block 205 in the memory 206, and pages 203 of the different programs 202a-d intermingled. Accordingly, during execution each program generally is required to maintain some amount of address validation, to ensure that no instruction references data that would otherwise be associated with a different program, or with the operating system.

In order for a program constructed for execution on a first architecture (e.g., a non-native architecture) to execute on a second architecture (e.g., a native architecture) with a different instruction set, the instructions, operands and control mechanisms of the operating system or user program must be converted to the instruction set of the native architecture. This involves not only translating the instruction function code to the native architecture but the entire addressing mechanism, with inherent address checking and verification, must also be translated.

Referring generally to FIGS. 1-2, although in some embodiments the optimization techniques described herein for reducing address checking and verification requirements can be applied in an at least partially static translation system it is recognized that the techniques applied herein could apply to either static or dynamic translation systems. Furthermore, although certain examples provided herein relate to translation of code written for the Unisys ClearPath architecture in a Linux environment on an Intel architecture hardware platform, the processes described herein will apply to other operating systems executing on other hardware platforms.

Figure 3:
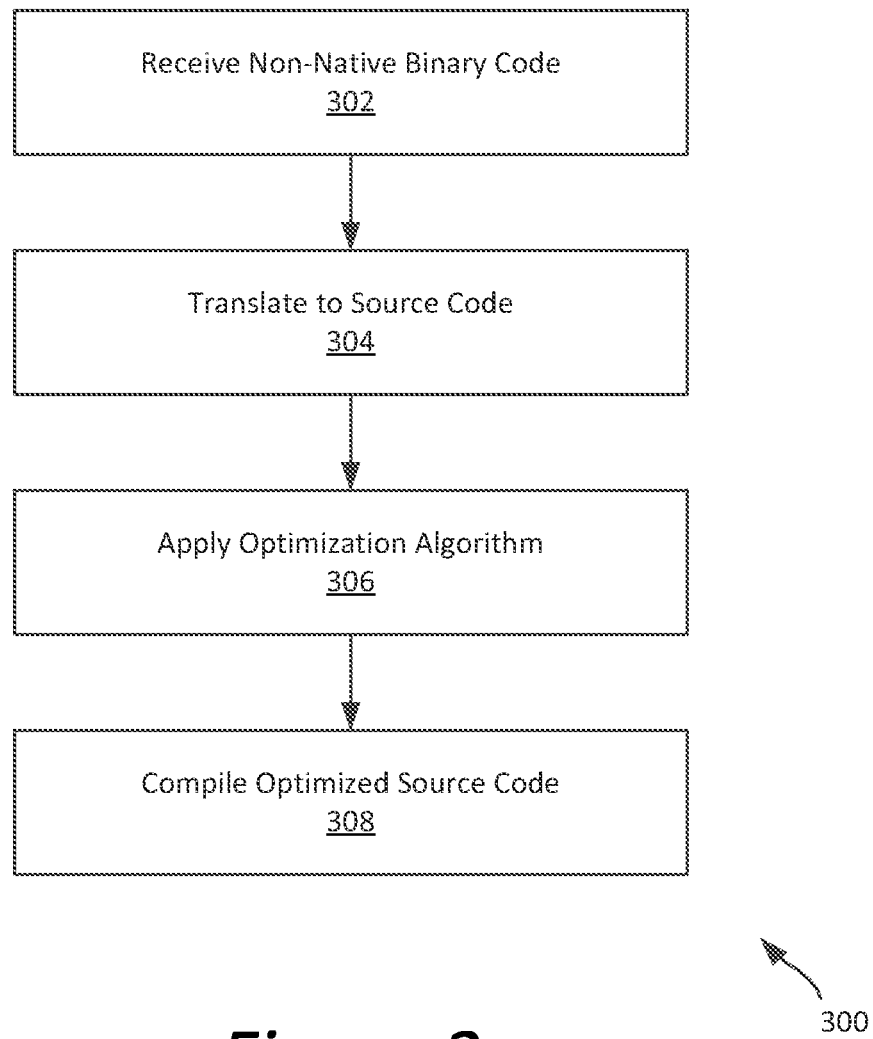
FIG. 3 is a flowchart illustrating a method for optimizing generation of natively executable code from non-native code, according to an example embodiment.

Referring now to FIG. 3, a method 300 for optimizing generation of natively executable code from non-native code is illustrated, according to an example embodiment. In some embodiments, the method 300 can be performed, in some embodiments, to effect the transition from non-native binary code to native binary code as illustrated in FIG. 1.

The method 300 includes receipt of non-native binary code, such as non-native code 102 of FIG. 1 (step 302), as well as parsing and translation of that code to source code (step 304). Receiving the non-native binary code can include, for example, loading the non-native binary code into a memory of a computing system operating that uses a native instruction set. Translation can correspond to, for example, parsing the non-native binary code to identify a variety of features in the non-native binary code, including blocks of instructions and data. The parsing can also identify opcodes and operands associated with those instructions, and including a plurality of function calls in the code that perform the equivalent functionality of those instructions. For example, the below code segment represents a source code translation in C++ of an example of a code segment, which represents output of this initial parsing pass through the non-native code. In the below example, a Unisys ClearPath instruction set and addressing scheme is reflected as the non-native binary code. Specifically, the lines labeled 2-5 represent a load address ("LA") instruction. The instruction loads the contents of memory at address 06, as modified by the X10, B1 registers (the index and base registers, respectively) into the upper half ("H2") of register A1:

```
L003403:
        LOGVA(Lg, "003403"); // 003403 100432210006 LA,H2 A1,*06,X10,B1
        ParOffsetUpdate(003403);
        Icount_Inc;
    pXreg[13]=ShiftH2(TranslateRead1(1,CalcAddrByX24_NoInc(10,06))[0]);
```

In this example, to actually obtain the contents of memory at the X10, B1 registers, those register addresses must be calculated as locations in memory of the target system. Accordingly, a function "CalcAddrByX24_NoInc" performs an address calculation based on index register "10" and the address "06", representing the operand address register, in a 24-bit addressing mode. This generally includes validation of the index register as valid within this code block. Other options available in the Unisys ClearPath instruction set provide for post-incrementing and/or 18 bit addressing, and different types of functions are defined in source code that provide validation of and calculation of relative addresses in these varying addressing modes.

Once the particular address calculation function completes during non-optimized operation of a translation system, a read operation "TranslateRead1" obtains the contents at base above. In various embodiments, the optimization algorithm can occur during a second pass through the non-native code and/or the source code that is generated during the translation step (step 304). Various optimization algorithms could be applied. In an example embodiment, an optimization algorithm translates source code such that fewer address validations are required. In the below example, which represents a comparison to the code block illustrated above, illustrates a translation of the code in block L003403. In that example, the "TranslateRead1" function is converted to a "TranslateAddr_48_05B1" pointer, which is defined in terms of an offset (06) from the B1 register. This translation allows normal operation of the compiled source code that would avoid multiple validations of addresses per operand access. In particular, the argument passed to the "Translate Addr_48_05B1" operation indicates a start address of "05" and a validated range of 6 words long (i.e., "06" addresses):

```
...
PULONGLONG TranslateAddr_48_05B1;
...
L003403:
    {
        LOGVA(Lg, "003403"); // 003403 100432210006 LA,H2 A1,*06,X10,B1
        if
        (!(TranslateAddr_48_05B1=TranslateReadX(1,CalcAddrByX24_NoInc(1
        0,05),6)))
        {
            fnLog("Null pointer returned for TranslateAddr_48_05B1");
        }
        ParOffsetUpdate(003403);
        Icount_Inc;
        pXreg[13]=ShiftH2 (TranslateAddr_48_05B1[06-05]);
        ...
``` register 1 ("B1") relative to the address calculated by the "CalcAddrByX24_NoInc" function. The TranslateRead1 function then verifies that the operand address is valid for a memory read operation, and returns a pointer to an address structure representing the operand absolute address. This validation can occur, for example, by comparing the calculated address to addresses allowed for use by the program defined in the non-native binary code, to ensure that the referenced address is within the portion of memory associated with that code (i.e., a particular block 205 of memory 206 for the program defined in the code, as illustrated in FIG. 2).

Figure 4:
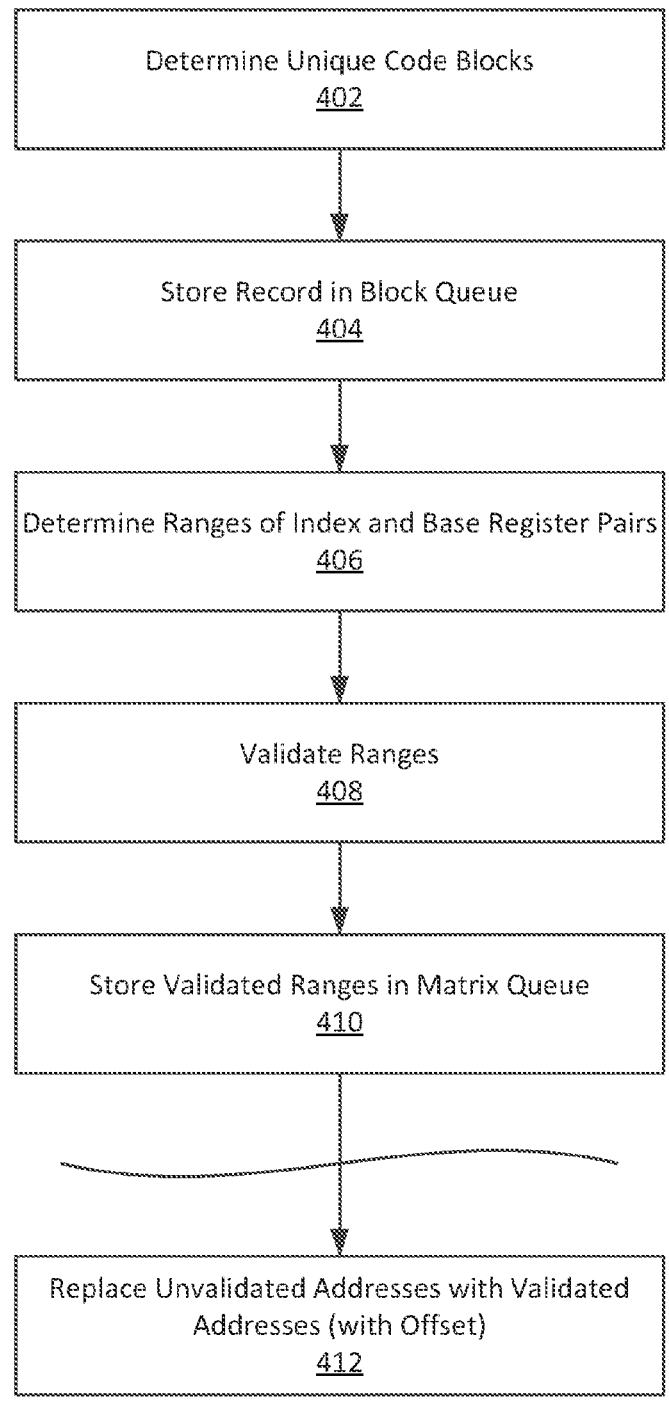
FIG. 4 is a flowchart illustrating a method of parsing source code to optimize the code for execution on a native instruction set architecture, according to an example embodiment.

It is noted that, based on the above function calls, each memory access is generally associated with a set of at least two nested address calculations in which address validations must be performed in each. Furthermore, one or more additional operations can be performed, which add additional overhead to the source code that is generated from non-native binary code. For example, as illustrated in FIG. 4, when parsing the non-native code, one or more data structures can be generated which reflect features detected in the code. For example code block boundaries, ranges or registers used within each code block, and other features can be detected.

In the embodiment shown, an optimization algorithm is then applied to the source code, for example to reduce a number of memory or register validation steps required as defined in the source code (step 306), and as mentioned Specifically, in this example, the instruction including the "TranslateReadX" references an operand with the program relative address 6, X10. In the line including the "TranslateAddr_48_05B1" pointer uses that pointer just assigned with a relative offset to the pointer base. The pointer base is address 5. The instruction operand address is 6. The reference to the pointer is given as [6-5]. This represents the 2nd address in the verified address range with relative address 5 being the 1st with a pointer offset [5-5] which is 0.

As seen in this code, the original operand address function calls are replaced by the new references to the pointer "TranslateAddr_48_05B1'. Much of the function of the $2^{nd}$ (outer) loop of the original source code is involved in analyzing each translated program line and deciding whether any pointer substitution will be necessary and if so, making the substitution correctly.

As such, due to avoidance of nested address calculation and verification functions (i.e., by using a single function call in the primary operational flow), fewer address validations are typically required during translation and execution of translated code.

In some embodiments, this optimization algorithm includes generation of and use of one or more data structures configured to track blocks used within non-native code, as well as index and base register pairs used within each block. Examples of such data structures are discussed in further detail in connection with FIGS. 5-8, below.

A compilation operation then compiles the optimized source code, creating native binary code for execution on a native computing system (step 308). This can include, for example, passing the (now-optimized) source code (e.g., C/C++ code) to a compiler configured to generate source code, alongside any predefined functions configured to represent simulated functions performed in the non-native architecture.

In general, in the context of the present disclosure the method 300 is performed using an at least partially static translation scheme. Details of such a translation system, also referred to herein as a "Just-In-Time" static translation system, are discussed in U.S. patent application Ser. No. 13/299,458 filed Nov. 18, 2011 entitled "Just-In-Time Static Translation System for Emulated Computing Environments" and U.S. patent application Ser. No. 13/299/452, filed Nov. 18, 2011, and entitled "Systems and Methods for Debugging Just-In-Time Static Translation in An Emulated System", the disclosures of which are hereby incorporated by reference in their entireties. However, in alternative embodiments, fully static or fully dynamic translation schemes, or other hybrid arrangements, could be implemented as well.

Figure 5:
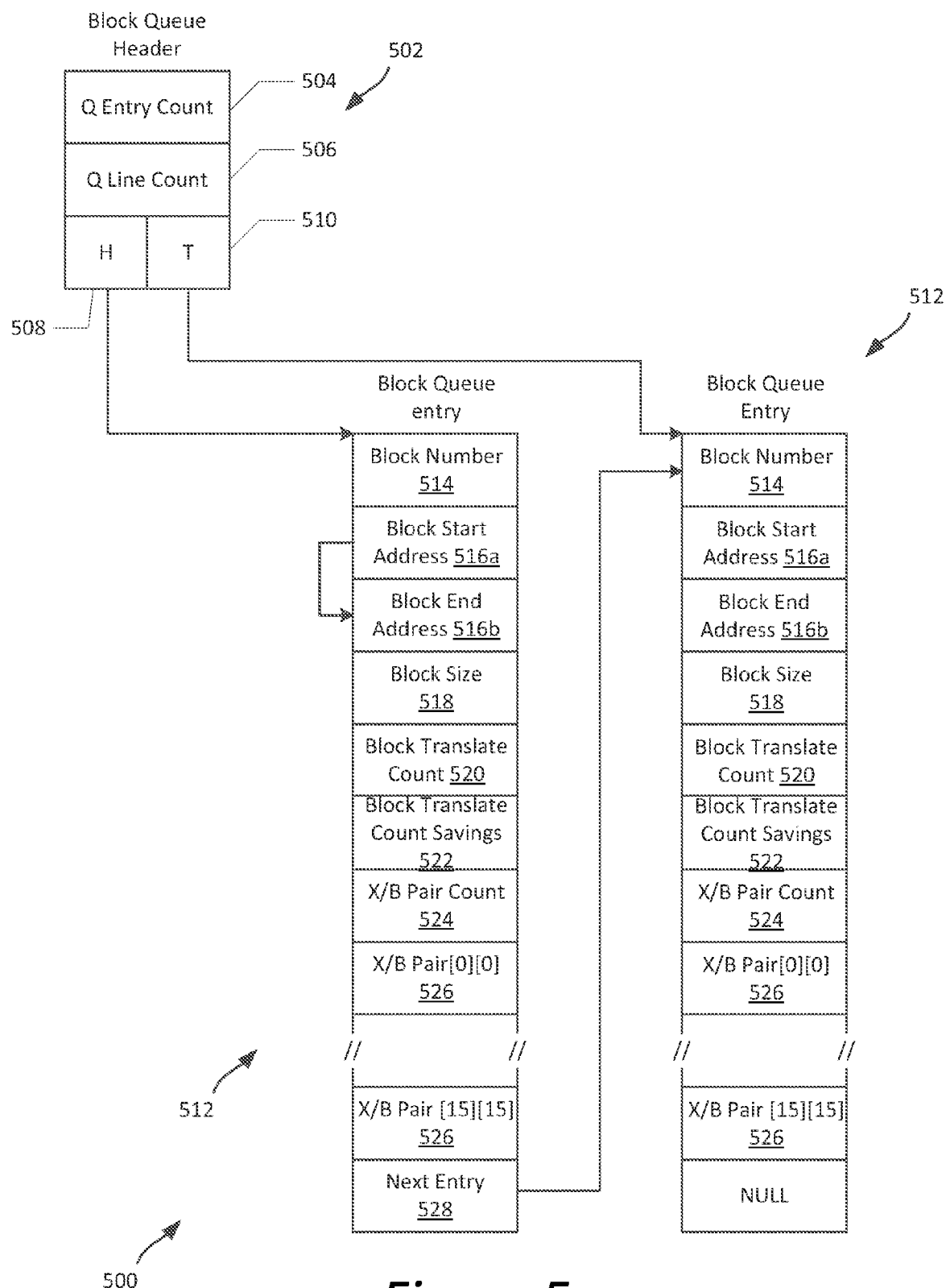
FIG. 5 is a logical diagram of a block queue useable to implement aspects of an optimized translation system, according to a possible embodiment.

Referring now to FIG. 4, a method 400 for parsing source code to optimize the code for execution on a native instruction set architecture is illustrated, according to an example embodiment. The method 400 can be, in some embodiments, a method of optimizing source code, such as is illustrated in step 306 of FIG. 3. The method 400 can be performed, at least in part, during and after creation of the source code file discussed above in connection with FIG. 3. In the embodiment shown, the method 400 includes parsing code to determine an identity of code blocks being used by the non-native code (step 402). This can include parsing the non-native code to identify code blocks used, or parsing the source code to detect code block labels. Each block within the non-native code (or as reflected in the source code) is stored as an entry in a block queue (step 404). Generally, a block queue is useable by the systems and methods of the present disclosure to track the blocks used by a particular non-native program, or multiple such programs requiring translation. An example of a block queue is illustrated in FIG. 5, below.

In the embodiment shown, the method 400 further includes determining one or more ranges of index and base register pairs used within each block (step 406). In such embodiments (typically those using register-based addressing, such as the Unisys ClearPath architecture), the method includes building a list of used index and base register pairs, representing a range of addresses used by the program to be translated within each block. The range of addresses can, in certain embodiments, be as described below in connection with FIG. 6.

The method 400 further includes determining a validated set of addresses useable within each block of code, such that the one or more translations described above in connection with FIG. 3 can take place (step 408). Determining a validated set of addresses can include, for example, identifying ranges of index and base register pairs which relate to ranges of addresses used, such that only a first use of such addresses (or first uses after certain events) may require validation. Ranges of used index and base register pairs are then stored in a matrix queue (step 410), such as that illustrated in FIG. 7.

The method also includes an optimization step (step 412) in which memory access and validation steps are reduced by replacing memory access functions that require validation (i.e., "unvalidated" addresses constituting pairs of index and base registers) with memory access functions that do not require further validation, for example because they are described as offsets relative to previously validated addresses (of index and base registers).

In some embodiments, once a first pass through the source code or non-native code is performed (e.g., in steps 402-410), it is generally the case that the source code is analyzed to the extent that all blocks that are used in the non-native code are known and entries are provided in a block queue and index and base register pairs (i.e., detected occupied/used index and base register addresses within a given code block) are included within a matrix queue. At this point, a second pass will occur, in which the one or more optimizations available to be applied to the source code, based on accessed/used memory addresses, are applied (step 412). In alternative embodiments, additional passes through the code (either the non-native binary code or source code) could be used as well.

It is noted that, in some embodiments, it is assumed that some address modification (index or base register contents) will change during execution, the static translation process will incorporate additional routines that will be activated at appropriate points during the program execution to perform address validation dynamically. However, to the extent possible, address validation processes are eliminated from the translation process to speed execution of translated code.

Referring now to FIG. 5, an example block queue 500 is illustrated that is useable to implement aspects of the present disclosure. The block queue includes a queue header that includes an entry count 504 and a line count 506. The entry count 504 represents a number of blocks tracked in the block queue 500, and the line count 506 corresponds to a number of lines translated. The queue header 502 further includes a head pointer 508 and a tail pointer 510. The head pointer 508 and tail pointer 510 store addresses of first and last block queue entries 512, respectively.

Each block queue entry 512 stores a block number 514, a block start and end address 516a-b, a block size 518, as well as information tracking index and base register entries and savings from calculating a reduced number of address translations. For example, a translation count 520, a translation count savings 522, as well as a count of index and base register pairs 524, and pointers 526 to each corresponding index and base register pair in each block. For example, in the Unisys ClearPath architecture, up to 16 different index registers and 16 different base registers can be used, resulting in access of up to 256 pairs of addresses per block. Additionally, a pointer to a next block queue entry 528 could be included as well.

In accordance with the present disclosure, a number of unique code blocks that exist within the translated program and the constituent components of each code block are detected and the block queue is populated in a new queue entry for each code block. For example, as discussed above, an initial loop starts reading the translated program line by line until it detects a label line. As mentioned above, a label line represents the start of a new block and the termination of the previous code block, if not the first block. As each line within the current block is read and analyzed, the information is entered into the current block queue entry.

To create the block queue entries 512, when a line that represents a Unisys ClearPath instruction line is read, the line is analyzed to determine what index register and base register (if any) is used by this instruction. This information is stored in the current block queue entry, for example in the index and base register pointers 526 (each index and base register referred to herein as an X/B/pair). As an instance of a given X/B pair is detected, it is entered in the appropriate slot in the current block queue entry. The count of index and base register pairs 524 is also incremented. When the next label line is detected, the current block queue entry is closed.

Figure 6:
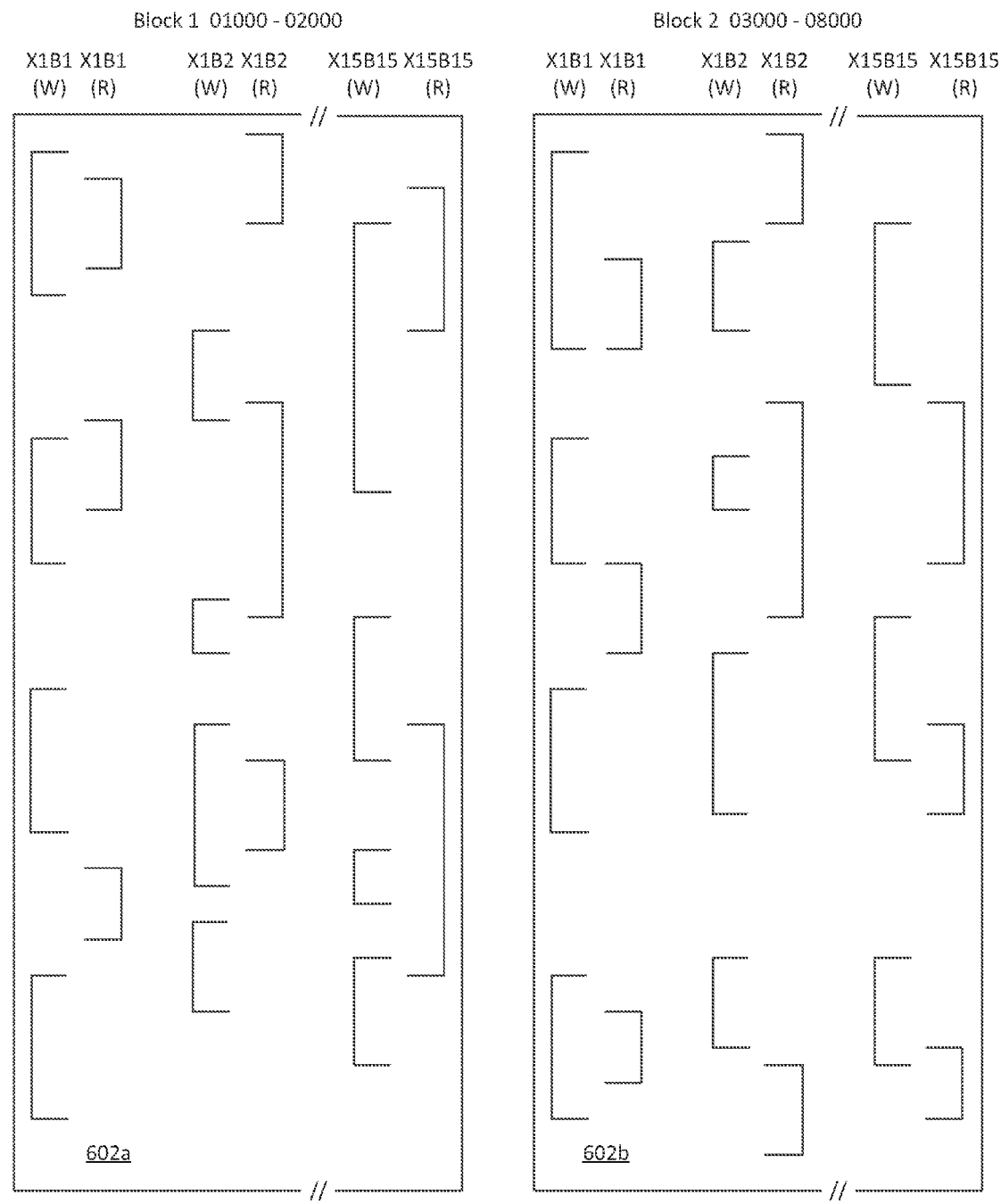
FIG. 6 is a logical diagram of ranges of base and index registers used in memory blocks of non-native code, according to an example embodiment.

Referring now to FIG. 6, an example logical diagram 600 illustrating ranges of base and index registers in memory blocks of non-native code are illustrated, according to an example embodiment of the present disclosure. In this example diagram 600, two blocks 602a-b are illustrated. As seen in block 602a, that block could contain instructions that reference the X/B pair X1/B1 for memory write access in four distinct groups of block line numbers within the block. The actual operand address generated by each operand access will be within a given range within a specific group. The address ranges for a given X/B pair will differ between groups as a result of either/or both the index register (X register) or the base register (B) register values having been changed by the executing instructions. For example, in a first X1/B1 pair range in block 602a the generated operand address range might be from 100-200. If either the X register contents or the B register contents change, a new operand address range will result, representing a different X1/B1 group for write and read access within block 602a. The same is true for other X/B pair ranges within each block 602a-b.

Figure 7:
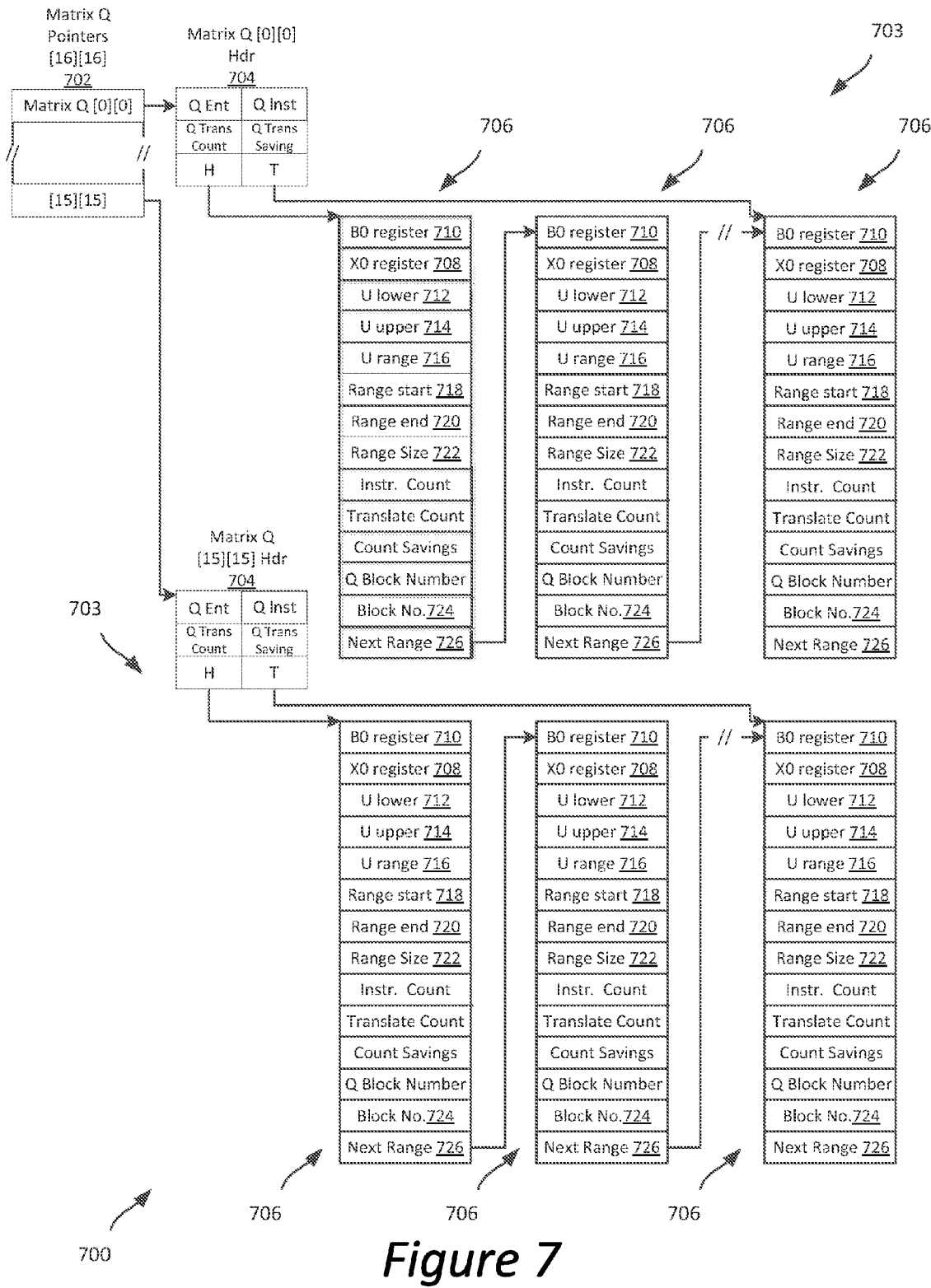
FIG. 7 is a logical diagram of a matrix queue useable to implement aspects of an optimized translation system, according to a possible embodiment.

Referring now to FIG. 7, a logical diagram of a matrix queue structure 700 useable to implement aspects of an optimized translation system is illustrated. The matrix queue illustrates ranges of index and base registers (X/B pairs) that are used within a particular code block, such that it is possible to detect for which pairs offsets among pairs can be used. In the embodiment shown, the matrix queue structure 700 includes matrix queue pointers 702, which represent the list of 256 pointers to each possible matrix queue entry (16 for each index register and base register). Each matrix queue pointer 702 refers to a different matrix queue 703, which includes a header 704. The matrix queue header 704 includes queue entry, queue instructions, and queue transaction information. The matrix queue header 704 further includes pointers to a head and a tail matrix queue entry, in a group of matrix queue entries 706.

Each matrix queue entry 706 represents a particular range of addresses accessible by a particular X/B pair, i.e., a range as illustrated within the blocks 602a-b of FIG. 6. Each matrix queue entry 706 includes a variety of types of information describing X/B pairs used within a particular block. The matrix queue entries each include, for example, X and B register contents 708, 710 (i.e., base and index addresses), as well as upper, lower, and range values defining an offset from the X/B pair that corresponds to a valid range (data elements 712-716, respectively). Additionally, range start, stop, and length data are included in each matrix queue entry as well (elements 718-722). Each matrix queue entry 706 will also contain the number of the code block 724 in which the range occurred, and various pieces of control information. A next entry pointer 726 within each matrix queue entry 706 points to a next matrix queue entry defining a range of addresses using the same X/B pair.

In use, the matrix queues 703 are each built during parsing of either the non-native code or source code, to determine the generated operand address range. That is, the first time within a code block a non-native instruction is read that utilizes a previously unused (and therefore unvalidated) X/B pair, the actual operand address is logged as the start address and end address for that X/B pair in X and B register contents entries 708, 710. The operand addresses of subsequent occurrences of the same X/B pair will be compared to the start address and end address of that X/B pair for the current X/B pair range. If the current address is either less than the current start address for that X/B pair within the current block or greater than the corresponding end address for that X/B pair within the same X/B pair block, the appropriate start or end address is changed to the address generated by the current instruction. Consequently, matrix queue entries 706 are generated, with a separate queue for each pair of X/B registers, and individual queue entries representing the individual X/B pair address ranges that occur within each code block.

When building the matrix queue entries 703 of FIG. 7, a number of complications may occur due to addressing overlap issues. For example, a current matrix queue entry for an X/B address pair (e.g., X1/B1) may have a current operand start address of 1000 and an operand end address might be 2000. The next instruction line that is read may change the value in the X register, or the base register B might be reloaded to assign a different code bank to that base register. In this situation, the existing X1/B1 matrix queue entry must be terminated and a new X1/B1 matrix queue entry be started. The reason for terminating the matrix queue entry when either an index register or base register are reloaded relates to how the address ranges are verified as a result of the optimization process and will be discussed later in this submission. When a matrix queue entry is terminated, it is added to the appropriate matrix queue. When the next address range for the same X/B pair is encountered, a new matrix queue entry is established.

Figure 8:
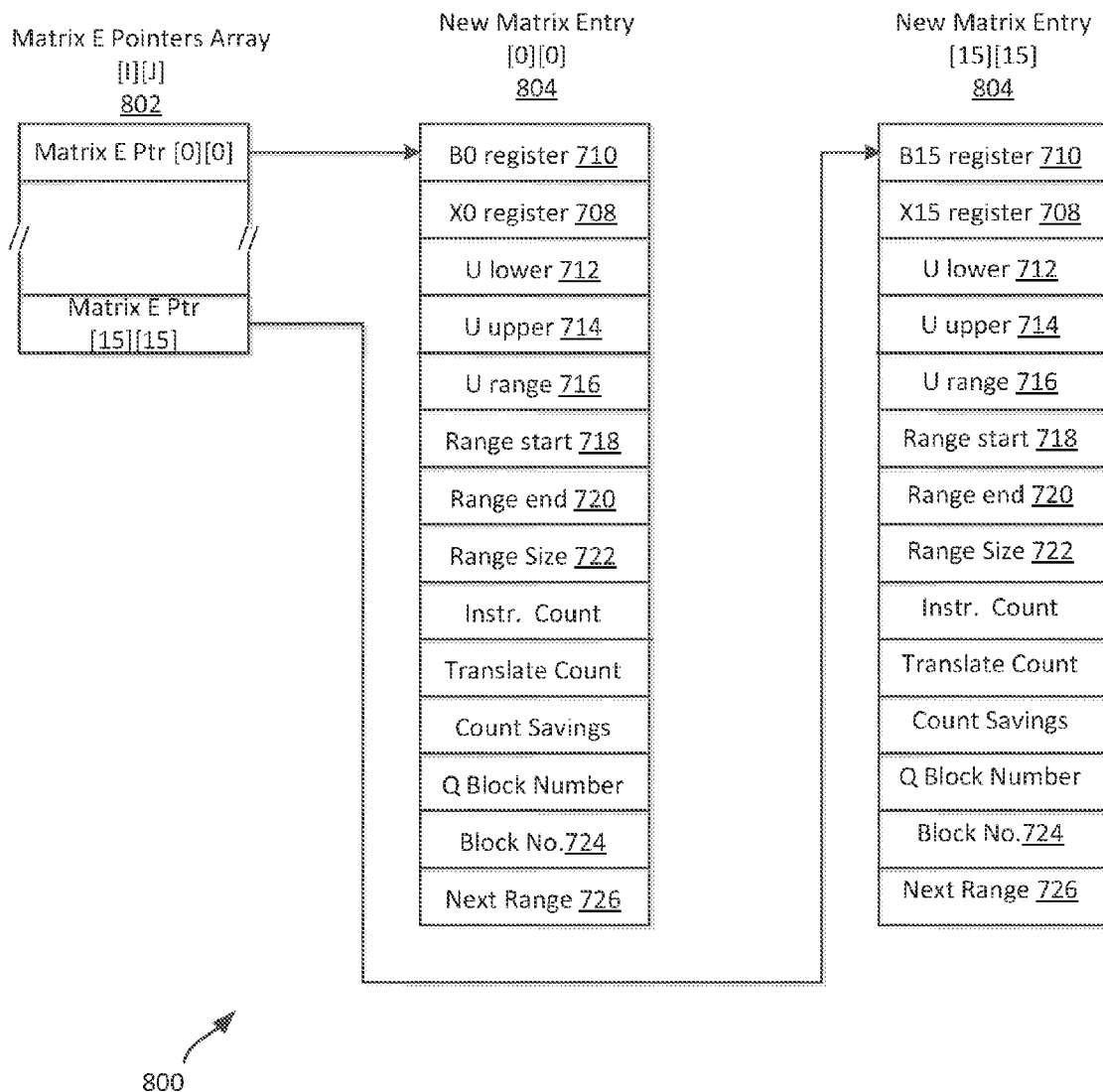
FIG. 8 is a new entry queue useable to implement aspects of an optimized translation system, according to a possible embodiment.

Referring now to FIG. 8, a logical diagram of a new entry queue 800 is illustrated, according to an example embodiment of the present disclosure. The new entry queue can be used to manage X/B pairs in the event of locking issues that might be encountered when multiple matrix queue entries are being edited. The new entry queue 800 avoids such issues by allowing new matrix queue entries to be completed in a separate data structure prior to insertion into the matrix queue 700. Accordingly, the new entry queue 800 includes a queue header 802 and one or more new entry queue entries 804. Each new entry queue entries 804 has fields corresponding to those in a matrix queue entry 706.

Figure 9:
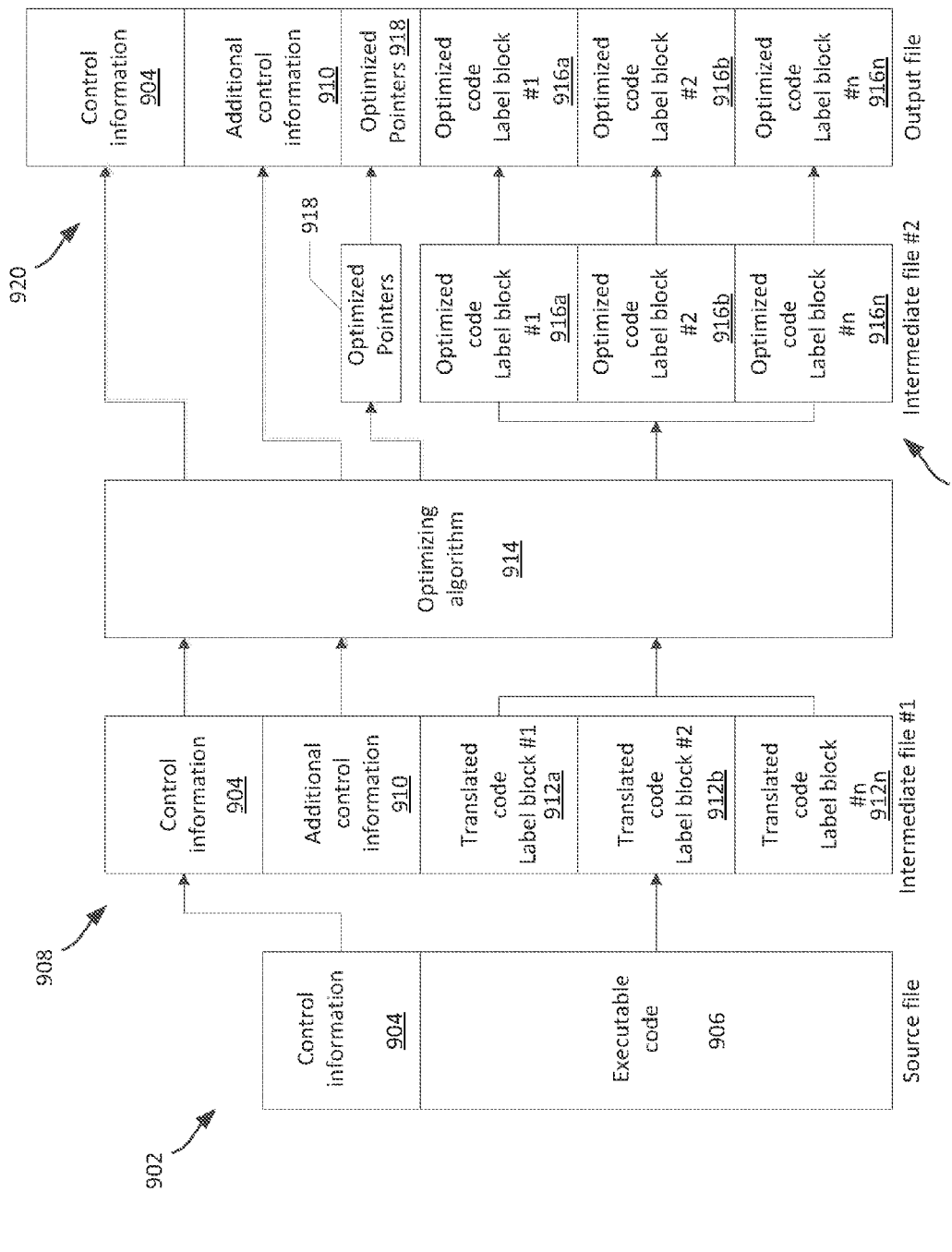
FIG. 9 is a block diagram illustrating files generated during an operand and limits optimization process for a just-in-time translation system.

Referring now to FIG. 9, a block diagram 900 illustrating files generated during an operand and limits optimization process for a just-in-time translation system is illustrated, according to one particular example embodiment, continuing the example of FIGS. 5-8. In this embodiment, an initial binary file 902 (e.g., corresponding to the non-native binary file 102 of FIG. 1) is illustrated. In this embodiment, the initial binary file 902 includes control information 904 and executable code 906.

In the embodiment shown, the code included in the initial binary file 902 is read into a translation program, and translated into 'C' and 'C++' code. The translated code is held in an intermediate file 908 to be read by the optimizing routines. The intermediate file includes the control information 904, propagated from the initial binary file 902, and includes additional control information 910, relating to controls required to be inserted into a source code file to ensure proper operation on the native instruction set. The intermediate file 908 also includes a plurality of translated code blocks, shown as code blocks 912a-n.

The intermediate file 908 is passed to an optimizing algorithm 914, which can, in certain embodiments, execute within a Just-In-Time static translation system, further details of which are discussed in U.S. patent application Ser. No. 13/299,458 filed Nov. 18, 2011 entitled "Just-In-Time Static Translation System for Emulated Computing Environments" and U.S. patent application Ser. No. 13/299,452, filed Nov. 18, 2011, and entitled "Systems and Methods for Debugging Just-In-Time Static Translation In An Emulated System", the disclosures of which were previously incorporated by reference.

During execution of the optimizing algorithm 914, one or more optimized code blocks are generated, illustrated as code blocks 916a-n. Code blocks 916a-n can be stored in an intermediate file, illustrated as file 917. Additionally, because certain information (e.g., pointer declarations) may not be known until after execution of the optimizing algorithm 914, an intermediate pointers file 918 is generated, due to the requirement that pointers be instantiated in the source code prior to use. As the translated code is processed by the optimizing algorithm 914, any declared pointers are written directly to the output file as they are declared to reside directly after the control information 904, 910.

Finally, an output file 920 includes the control information 904, additional control information 910 generated during translation of the binary file 902, the pointers file 918, and the optimized code blocks 916a-c. The output file can then be translated, for example by a compiler, to result in native code executable on a target (native) instruction set architecture.

Referring to FIGS. 1-9 generally, it is noted that the optimization algorithms, and systems implementing such algorithms, provide a mechanism for improving execution times in a just-in-time static translation system. In particular, in some embodiments, an example block queue generated from sample code can contain entries such as those which follow:

TABLE 1

| | | | | | | | |
|---|---|---|---|---|---|---|---|
| | | Block Queue | | | | | |
| Address | Block Number | Translate Call Savings | Start Address | End Address | Size | X/B Num | Next |
| 0x1f7858 | 0 | 0 | 121 | 126 | 6 | 1 | 0x26ef420 |
| 0x26ef420 | 1 | 0 | 127 | 132 | 6 | 1 | 0x26ef7e8 |
| 0x26ef7e8 | 2 | 0 | 133 | 138 | 6 | 1 | 0x26efbb0 |
| 0x26efbb0 | 3 | 0 | 139 | 144 | 6 | 1 | 0x1f8ad8 |
| 0x1f8ad8 | 4 | 0 | 145 | 150 | 6 | 1 | 0x1f8ea0 |

A sample subset of the block queue entries are printed in Table 1 with their control information. In the sample code, 2245 translation calls are made to all X/B pairs, and therefore two function calls each eliminated by an optimization routine.

In this example the block queue translation call savings represents a savings of 2245 translation function calls. A corresponding matrix queue sample set is illustrated below in Table 2, in which the block in which the operand reference occurred is listed as well as the position in this particular queue:

TABLE 2

| | | | | | | | | | | | |
|---|---|---|---|---|---|---|---|---|---|---|---|
| | | | | Block Queue | | | | | | | |
| X/B Pair | Label Block Number | Queue Block Number Count | Inst Count | Xlate Call Save | H-Bit | I_bit | U addr Lower Value | U addr Upper Value | Range Start Line | Range End Line | Next Entry Address |
| X0/B0 | 0 | 0 | 1 | 0 | 0 | 0 | 2420 | 2420 | 122 | 122 | 0x26ef670 |
| X0/B0 | 1 | 1 | 1 | 0 | 0 | 0 | 2513 | 2513 | 128 | 128 | 0x26efa38 |
| X0/B0 | 2 | 2 | 1 | 0 | 0 | 0 | 2637 | 2637 | 134 | 134 | 0x26efe00 |
| X0/B0 | 3 | 3 | 1 | 0 | 0 | 0 | 2650 | 2650 | 140 | 140 | 0x1f8d28 |
| X0/B0 | 4 | 4 | 1 | 0 | 0 | 0 | 3034 | 3034 | 146 | 146 | 0x1f90f0 |
| X0/B0 | 5 | 5 | 1 | 0 | 0 | 0 | 7024 | 7024 | 152 | 152 | 0x1f94b8 |
| X0/B0 | 6 | 6 | 1 | 0 | 0 | 0 | 7112 | 7112 | 158 | 158 | 0x1f9880 |
| X0/B0 | 7 | 7 | 1 | 0 | 0 | 0 | 7165 | 7165 | 164 | 164 | 0x1f9c48 |
| X0/B0 | 8 | 8 | 1 | 0 | 0 | 0 | 7313 | 7313 | 170 | 170 | 0x1fa010 |
| X0/B0 | 9 | 9 | 1 | 0 | 0 | 0 | 5203 | 5203 | 176 | 176 | 0x1fa3d8 |
| X0/B0 | 10 | 10 | 1 | 0 | 0 | 0 | 3116 | 3116 | 182 | 182 | 0x1fa7a0 |

In this example, the matrix queue shows entries for the first X0/B0 queue. A total bank instruction count corresponds to, in the sample code used 8392 instructions, with 2245 bank translation and validation function calls saved.

Based on the examples illustrated above, in a just-in-time static translation system the optimization techniques described herein can provide substantial execution advantages. For example, rather than using conventional data and control flow analysis, two optimization loops are provided to remove memory validation steps occurring in the code, and reducing the number of pointers to memory that are used. This reduces stack, heap, and general memory usage, as well as reducing execution time required to validate addresses. In experimental uses, up to about 15% performance improvements have been observed.

Figure 10:
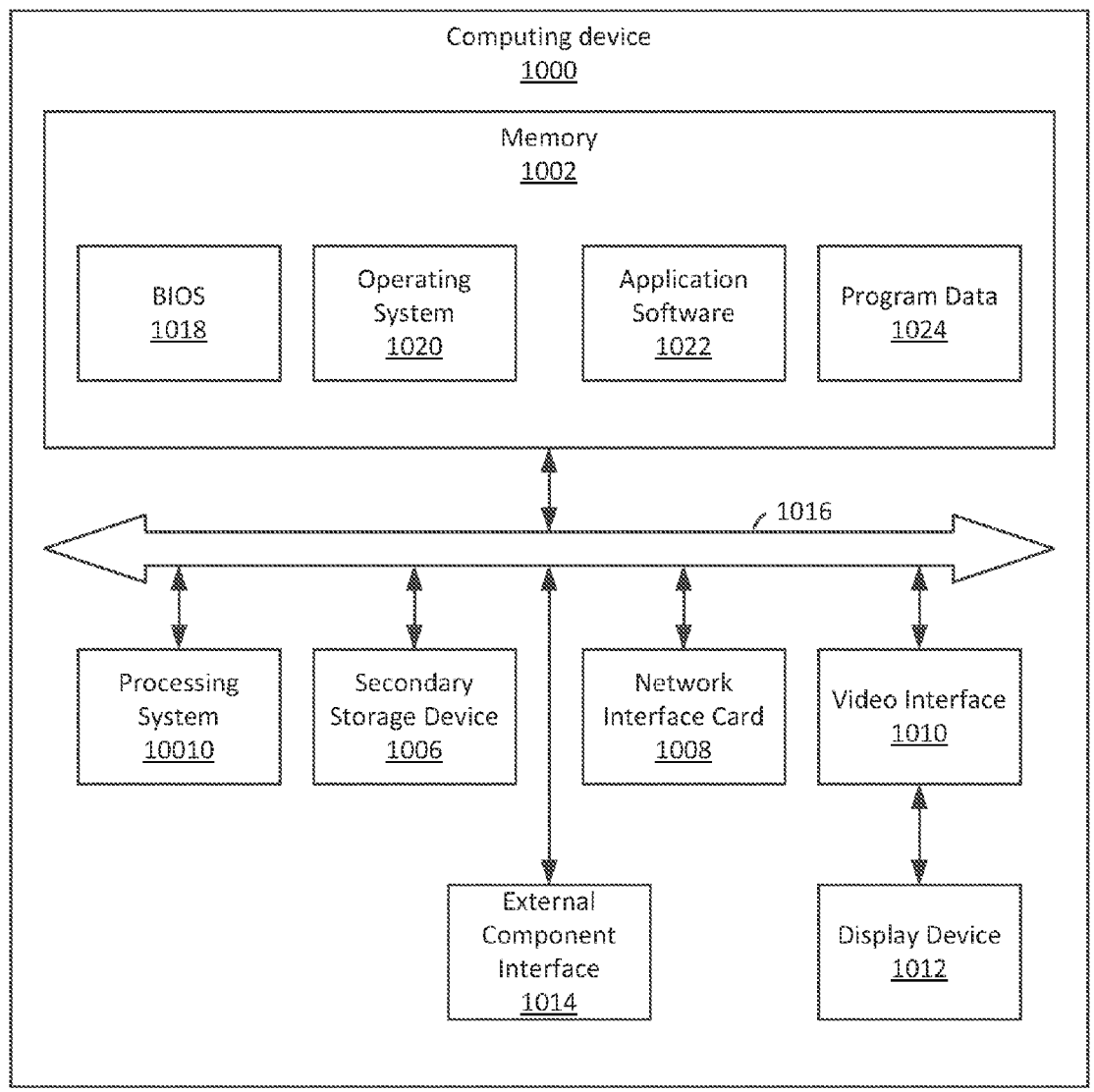
FIG. 10 illustrates an electronic computing device with which aspects of the just-in-time static translation emulation system can be implemented.

Referring now to FIG. 10, a block diagram illustrating an example computing device 1000 is shown, which can be used to implement aspects of the present disclosure. In particular, the computing device 1000 can represent any of a variety of computing devices used as a native computing system capable of executing translated code, and for translating non-native code in a just-in-time static translation system, as discussed above.

In the example of FIG. 10, the computing device 1000 includes a memory 1002, a processing system 1004, a secondary storage device 1006, a network interface card 1008, a video interface 1010, a display unit 1012, an external component interface 1014, and a communication medium 1016. The memory 1002 includes one or more computer storage media capable of storing data and/or instructions. In different embodiments, the memory 1002 is implemented in different ways. For example, the memory 1002 can be implemented using various types of computer storage media.

The processing system 1004 includes one or more processing units. A processing unit is a physical device or article of manufacture comprising one or more integrated circuits that selectively execute software instructions. In various embodiments, the processing system 1004 is implemented in various ways. For example, the processing system 1004 can be implemented as one or more processing cores. In another example, the processing system 1004 can include one or more separate microprocessors. In yet another example embodiment, the processing system 1004 can include an application-specific integrated circuit (ASIC) that provides specific functionality. In yet another example, the processing system 1004 provides specific functionality by using an ASIC and by executing computer-executable instructions.

The secondary storage device 1006 includes one or more computer storage media. The secondary storage device 1006 stores data and software instructions not directly accessible by the processing system 1004. In other words, the processing system 1004 performs an I/O operation to retrieve data and/or software instructions from the secondary storage device 1006. In various embodiments, the secondary storage device 1006 includes various types of computer storage media. For example, the secondary storage device 1006 can include one or more magnetic disks, magnetic tape drives, optical discs, solid state memory devices, and/or other types of computer storage media.

The network interface card 1008 enables the computing device 1000 to send data to and receive data from a communication network. In different embodiments, the network interface card 1008 is implemented in different ways. For example, the network interface card 1008 can be implemented as an Ethernet interface, a token-ring network interface, a fiber optic network interface, a wireless network interface (e.g., Wi-Fi, WiMax, etc.), or another type of network interface.

The video interface 1010 enables the computing device 1000 to output video information to the display unit 1012. The display unit 1012 can be various types of devices for displaying video information, such as a cathode-ray tube display, an LCD display panel, a plasma screen display panel, a touch-sensitive display panel, an LED screen, or a projector. The video interface 1010 can communicate with the display unit 1012 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 1014 enables the computing device 1000 to communicate with external devices. For example, the external component interface 1014 can be a USB interface, a FireWire interface, a serial port interface, a parallel port interface, a PS/2 interface, and/or another type of interface that enables the computing device 1000 to communicate with external devices. In various embodiments, the external component interface 1014 enables the computing device 1000 to communicate with various external components, such as external storage devices, input devices, speakers, modems, media player docks, other computing devices, scanners, digital cameras, and fingerprint readers.

The communications medium 1016 facilitates communication among the hardware components of the computing device 1000. In the example of FIG. 10, the communications medium 1016 facilitates communication among the memory 1002, the processing system 1004, the secondary storage device 1006, the network interface card 1008, the video interface 1010, and the external component interface 1014. The communications medium 1016 can be implemented in various ways. For example, the communications medium 1016 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1002 stores various types of data and/or software instructions. For instance, in the example of FIG. 10, the memory 1002 stores a Basic Input/Output System (BIOS) 1018 and an operating system 1020. The BIOS 1018 includes a set of computer-executable instructions that, when executed by the processing system 1004, cause the computing device 1000 to boot up. The operating system 1020 includes a set of computer-executable instructions that, when executed by the processing system 1004, cause the computing device 1000 to provide an operating system that coordinates the activities and sharing of resources of the computing device 1000. Furthermore, the memory 1002 stores application software 1022. The application software 1022 includes computer-executable instructions, that when executed by the processing system 1004, cause the computing device 1000 to provide one or more applications. The memory 1002 also stores program data 1024. The program data 1024 is data used by programs that execute on the computing device 1000.

Although particular features are discussed herein as included within an electronic computing device 1000, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. In embodiments of the present disclosure, computer storage media excludes transitory signals.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of optimizing generation of natively executable code from non-native code, the method comprising:
receiving a source file including binary code configured for execution according to a non-native instruction set architecture;
translating one or more code blocks included in the executable binary code to source code;
optimizing instructions in the source code with an optimizing algorithm to obtain optimized source code, wherein optimizing comprises converting a first source code function to a second source code function that comprises fewer address validations than the first source code function when translated to natively executable binary code, and wherein the second source code function comprises one or more address validations when translated to natively executable binary code; and
compiling the optimized source code to generate an output file comprising natively executable binary code.

2. The method of claim 1, further comprising:
determining a number of unique code blocks within the executable binary code; and
storing a record of each block of the translated program as a queue entry in a block queue.

3. The method of claim 2, wherein the block queue includes a plurality of block queue entries, each block queue entry including a block number, a start address, an end address, a block size, and one or more index and base register pairs associated with the block.

4. The method of claim 1, wherein the optimizing algorithm comprises:
determining one or more ranges of index and base register pairs used in each block of the translated program;
validating the one or more ranges of index and base register pairs; and
for each of the instructions, replacing one or more unvalidated index and base register pairs with one or more corresponding addresses of a validated index and base register pair and an offset from the index and base register pair.

5. The method of claim 4, wherein the one or more unvalidated index and base register pairs are defined in the source code as a pair of nested memory address calculation function calls.

6. The method of claim 5, wherein the validated index and base register pair and the offset are defined in the source code using a single memory address calculation function call.

7. The method of claim 4, wherein each validated index and base register pair is included in a range of validated index and base register pairs stored in a matrix queue.

8. The method of claim 7, wherein the matrix queue includes an index register address and a base register address, a range, and a block identifier.

9. The method of claim 4, wherein determining and validating the one or more ranges of index and base register pairs occurs during a first loop through the binary code, and wherein replacing the one or more unvalidated index and base register pairs occurs in a second loop.

10. A system for optimizing generation of code natively executable on a computing system based on non-native binary code, the system comprising:
a block queue containing a block queue entry associated with each block included within the non-native binary code;
a matrix queue containing one or more entries each defining a range of validated index and base register pairs; and
an optimization component configured to receive a reference to an unvalidated index and base register pair and replace the reference with a second reference to an entry in the matrix queue representing a validated index and base register pair and an offset, wherein replacing the first reference with the second reference comprises converting a first source code function to a second source code function that comprises fewer address validations than the first source code function when translated to natively executable binary code, and wherein the second source code function comprises one or more address validations when translated to natively executable binary code.

11. The system of claim 10, wherein the block queue and matrix queue are implemented in a memory of a computer system implementing a native instruction set architecture.

12. The system of claim 11, wherein the non-native binary code cannot be natively executed on the computer system.

13. The system of claim 10, further comprising a translation component configured to translate the non-native binary code to source code, the source code provided to the optimization component.

14. The system of claim 10, wherein the reference to an unvalidated index and base register pair includes a nested function describing an address calculation function and an address verification function.

15. The system of claim 14, wherein the second reference corresponds to an address calculation function defining an address in terms of the validated index and base register pair and offset.

16. The system of claim 10, wherein the validated index and base register pair represents an index and base register pair that will be validated prior to execution of the second reference.

17. The system of claim 10, wherein the offset relates the validated index and base register pair to the unvalidated index and base register pair.

18. The system of claim 10, further comprising a new entry queue configured to receive one or more new matrix queue entries prior to inclusion in the matrix queue.

19. A computer-implemented method of optimizing generation of natively executable code from non-native code, the method comprising:
receiving a source file including binary code configured for execution according to a non-native instruction set architecture;
determining a number of unique code blocks within the executable binary code;
translating each of the code blocks included in the executable binary code to source code;
storing a record of each of the code blocks as a queue entry in a block queue;
determining one or more ranges of index and base register pairs used in each of the code blocks;
storing the one or more ranges of index and base register pairs in a matrix queue;
for each of the instructions in each code block, replacing one or more unvalidated index and base register pairs with a pointer and an offset, wherein the pointer represents a validated index and base register pair included in the matrix queue, wherein replacing one or more unvalidated index and base register pairs with a pointer and an offset comprises converting a first source code function to a second source code function that comprises fewer address validations than the first source code function when translated to natively executable binary code, and wherein the second source code function comprises one or more address validations when translated to natively executable binary code; and compiling the source code to generate an output file comprising natively executable binary code.

20. The computer-implemented method of claim 19, further comprising validating the one or more ranges of index and base register pairs.

\* \* \* \* \*